(12) United States Patent
Steinmaier

(10) Patent No.: US 6,622,975 B2
(45) Date of Patent: Sep. 23, 2003

(54) SUSPENSION DEVICE FOR A SWINGING LOAD, IN PARTICULAR FOR AN EXHAUST SYSTEM IN A MOTOR VEHICLE

(75) Inventor: Klaus Steinmaier, Waldkraiburg (DE)

(73) Assignee: SGF Suddeutsche Gelenkscheibenfabrik GmbH & Co KG, Waldkraiburg (DE)

( * ) Notice: Subject to any disclaimer, the term of this patent is extended or adjusted under 35 U.S.C. 154(b) by 0 days.

(21) Appl. No.: 10/200,408

(22) Filed: Jul. 22, 2002

(65) Prior Publication Data

US 2002/0175263 A1 Nov. 28, 2002

Related U.S. Application Data

(63) Continuation of application No. PCT/EP01/01363, filed on Feb. 8, 2001.

(30) Foreign Application Priority Data

Mar. 17, 2000 (DE) .......................................... 100 13 121

(51) Int. Cl.⁷ .................................................. F16L 3/16
(52) U.S. Cl. ........................ 248/60; 248/632; 248/634; 267/140.12
(58) Field of Search .......................... 248/60, 632, 610, 248/634, 635, 636; 267/293, 140.12, 141.4, 141.1

(56) References Cited

U.S. PATENT DOCUMENTS

| | | | | |
|---|---|---|---|---|
| 4,380,324 A | * | 4/1983 | Woesler | 248/610 |
| 4,550,795 A | * | 11/1985 | Teshima | 180/296 |
| 4,727,957 A | * | 3/1988 | Fujita | 181/208 |
| 4,746,104 A | * | 5/1988 | Probst | 267/140.1 |
| 4,893,778 A | * | 1/1990 | Drabing et al. | 248/610 |
| 5,032,342 A | * | 7/1991 | Drabing et al. | 264/263 |
| 5,050,837 A | * | 9/1991 | Hamada et al. | 248/610 |
| 5,271,595 A | * | 12/1993 | Simon et al. | 248/632 |
| 6,264,164 B1 | * | 7/2001 | Steinmaier | 248/610 |
| 6,343,777 B1 | * | 2/2002 | Andra | 248/610 |
| 6,402,119 B1 | * | 6/2002 | Miska | 248/613 |

* cited by examiner

Primary Examiner—Korie Chan
Assistant Examiner—Steven Marsh
(74) Attorney, Agent, or Firm—Clifford W. Browning; Woodard, Emhardt, Moriarty, McNett & Henry LLP

(57) ABSTRACT

A suspension device has a carrying region, at which it is to be connected to a carrying structure, and also a flexible load beam which essentially consists of elastomer material, is disposed between two articulating zones and has a centrally disposed centre of load distribution. At the latter, the load acting on the said load beam branches out towards the two articulating zones, which in turn are each connected to the carrying region by a carrying leg. The two articulating zones lie in a common transversal plane which extends transversely to the direction of action of the load. The centre of distribution of load is disposed, in the non-loaded condition, between the carrying region and the transversal plane, and the load beam is adapted to approach a stretched position in which the centre of distribution of load lies in the said transversal plane when the load increases and is directed away from the carrying region.

10 Claims, 4 Drawing Sheets

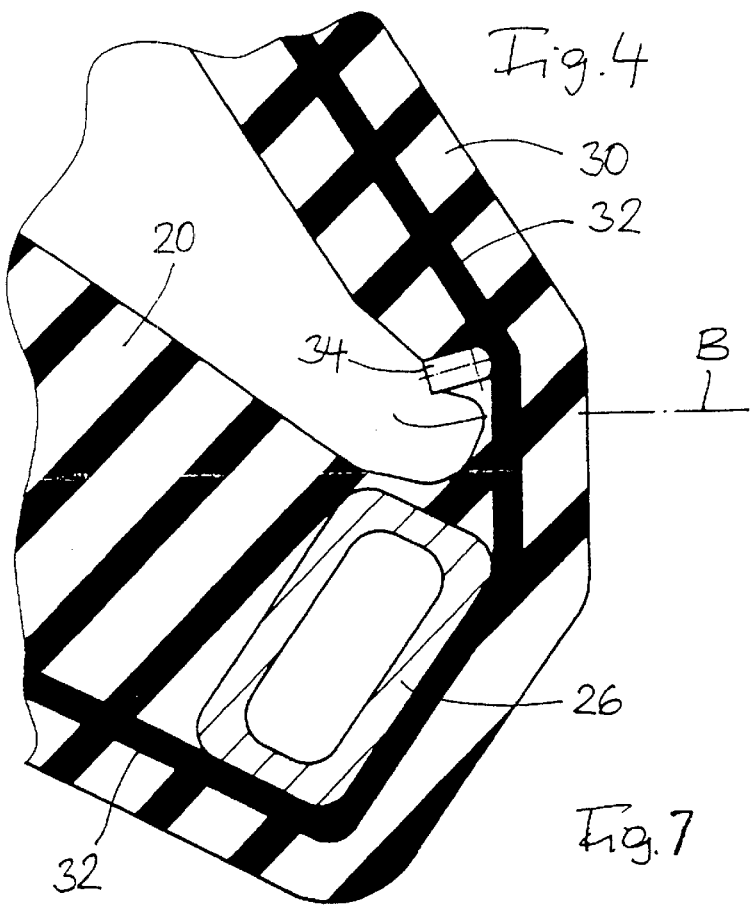
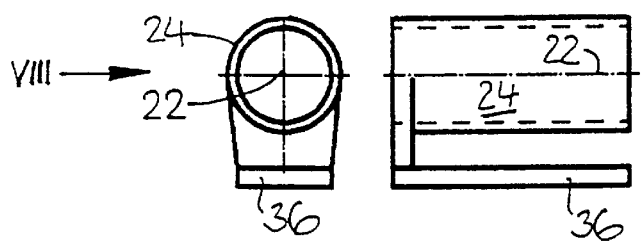
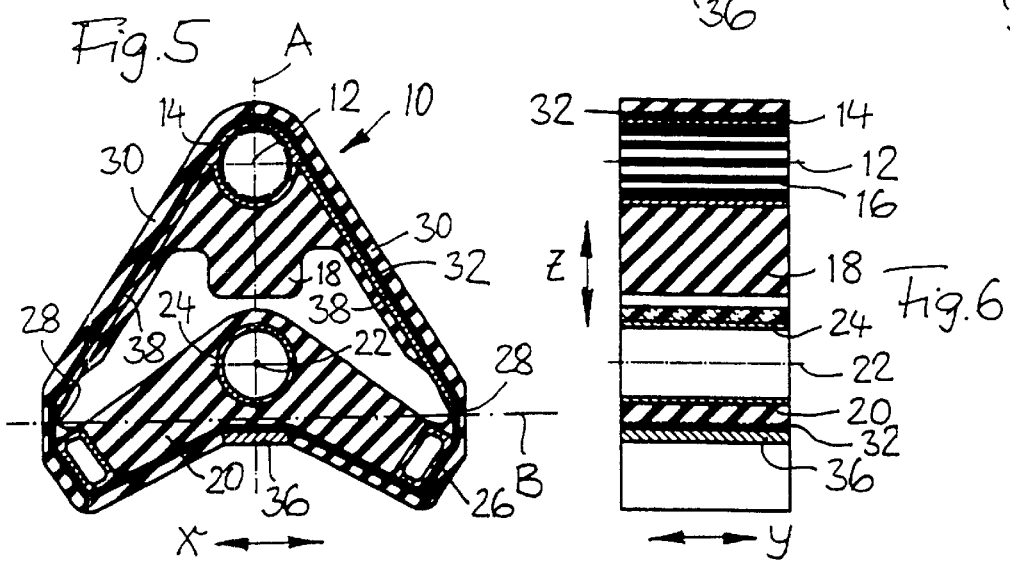

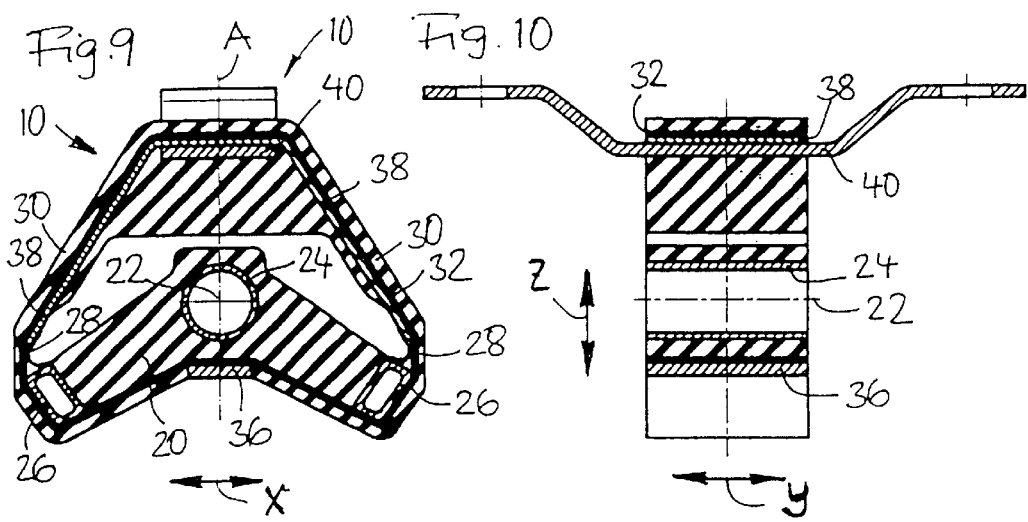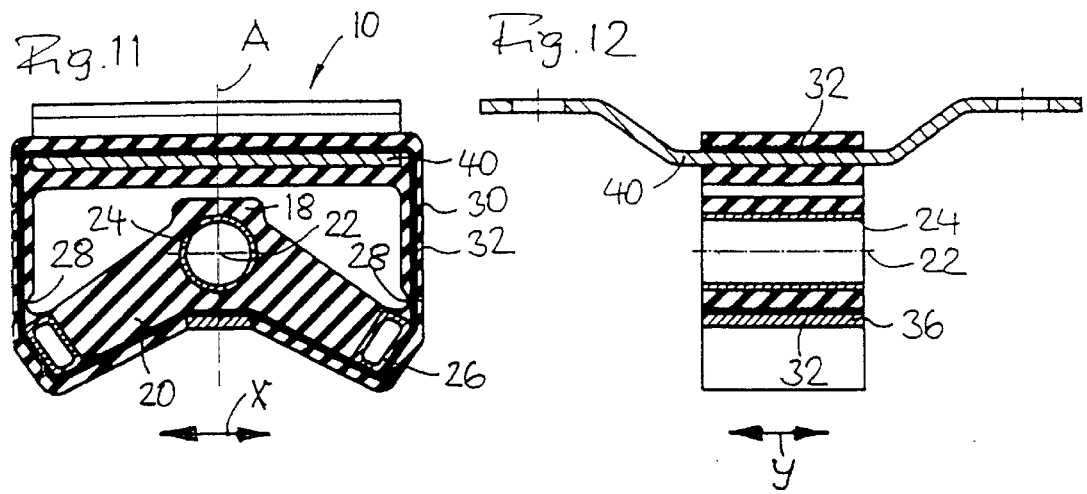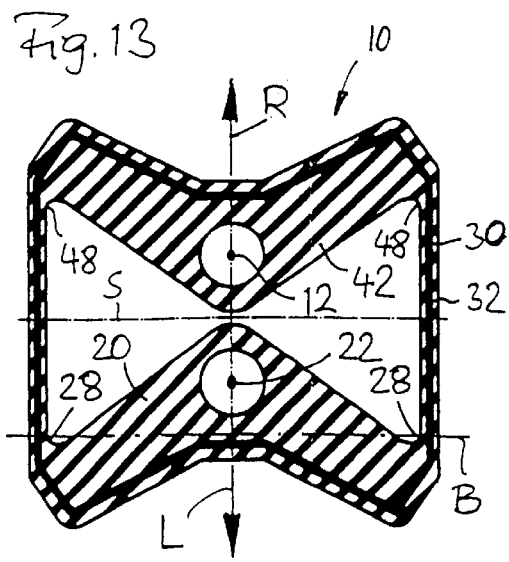

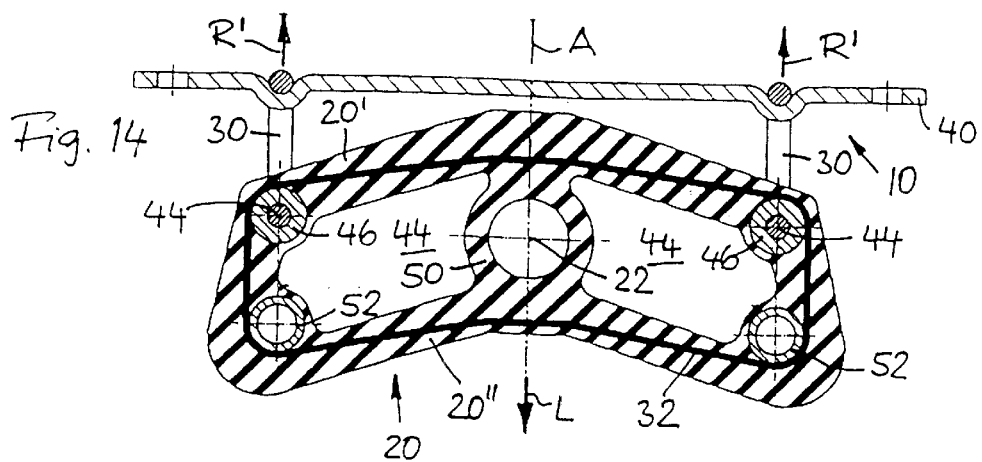
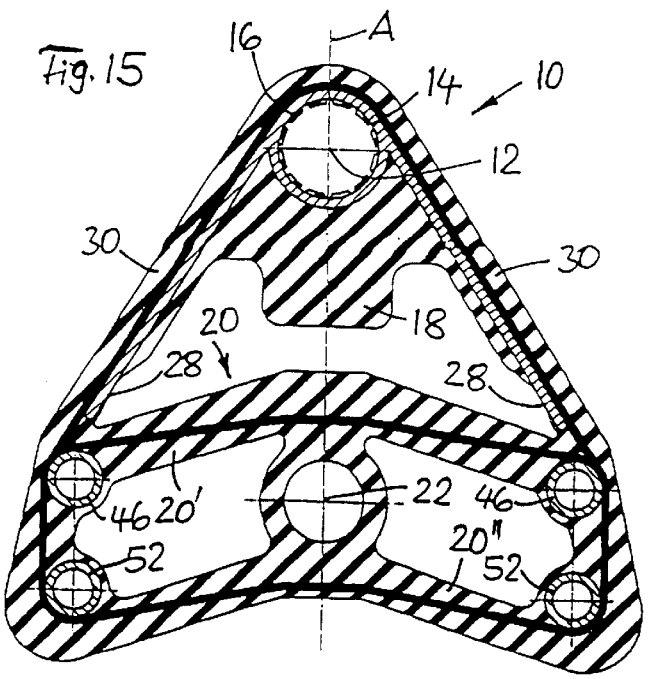
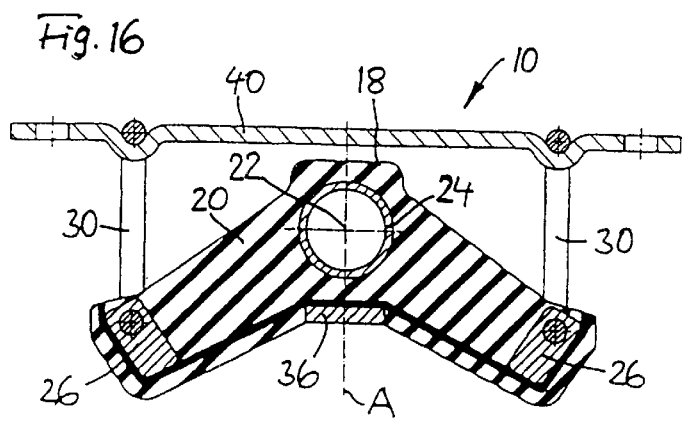
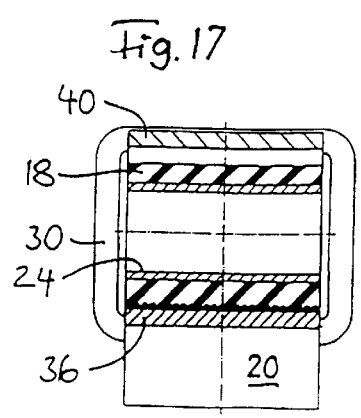

SUSPENSION DEVICE FOR A SWINGING LOAD, IN PARTICULAR FOR AN EXHAUST SYSTEM IN A MOTOR VEHICLE

This application is a continuation of international application number PCTEP01/01363, filed Feb. 8, 2001.

The invention relates to a suspension device according to the pre-characterising clause of claim 1.

A known suspension device of this kind (DE 198 12 347 C1) has the external shape of a rhombus which is formed by a carrying beam disposed at the top and having two downwardly angled carrying legs, and by a load beam disposed at the bottom and having two upwardly angled load legs. The four corners of the rhombus are rounded; a centre of application of force is constructed in the carrying beam in the region of the upper corner, whereas a centre of distribution of load is constructed in the load beam in the region of the lower corner, and one of the carrying legs, in each case, is connected in an articulating manner to one of the load legs, in each case, at the two remaining corners which are disposed in a common transversal plane. If this known suspension device is loaded in the intended manner with forces which are directed counter to one another and act on the centre of application of force and on the centre of distribution of load respectively, the said two centres not only move away from one another but also both move away from the transversal plane in which the two articulations lie. As a consequence of this, the overall height of the known suspension device, which height is already considerable in the non-loaded condition, increases from the outset when subjected to load. The spring characteristic is inevitably progressive and is therefore particularly suitable for heavy impact stresses, such as occur, for example, in all-terrain vehicles.

The underlying object of the invention is to design a suspension device for a swinging load, in particular for an exhaust system in a motor vehicle, in such a way that it takes up a lower overall height with the same maximum load-carrying capacity and the same maximum spring travel.

The object is achieved, according to the invention, by means of the features in claim 1. Advantageous further developments emerge from the subclaims.

Exemplified embodiments of the invention will be explained with further details below with the aid of diagrammatic drawings, in which:

FIG. 4 shows a greatly enlarged detail from the right half of FIG. 1;

FIG. 5 shows a perpendicular section, corresponding to FIG. 1, through a second suspension device which is supplemented in certain details;

FIG. 6 shows a section, which is normal to the sectional plane of FIG. 5 and is likewise perpendicular, in the plane A in FIG. 5;

FIG. 7 shows an individual part from FIG. 5, somewhat enlarged;

FIG. 8 shows the same individual part, viewed in the direction of the arrow VIII in FIG. 7;

FIG. 9 shows a third suspension device, in a perpendicular section;

FIG. 10 shows the section in the plane A in FIG. 9, which section is normal to the plane of the drawing in the said figure and is likewise perpendicular;

FIG. 11 shows a fourth suspension device, in a perpendicular section;

FIG. 12 shows the section in the plane A in FIG. 11, which section is normal to the plane of the drawing in the said figure and is likewise perpendicular;

FIG. 13 shows a fifth suspension device, in a perpendicular section;

FIG. 14 shows a sixth suspension device, likewise in a perpendicular section;

FIG. 15 shows a seventh suspension device, in a perpendicular section;

FIG. 16 shows an eighth suspension device, in a perpendicular section; and

FIG. 17 shows the section in the plane A in FIG. 16, which section is normal to the plane of the drawing in the said figure and is likewise perpendicular.

Each of the suspension devices represented is intended for suspending an exhaust system from a motor vehicle and is designed so as to be symmetrical with respect to a perpendicular plane of symmetry A which, in the installed position, extends transversely to the longitudinal direction, which is indicated by a double arrow X, of the motor vehicle. The said plane of symmetry A is thus parallel to the transverse axis Y of the vehicle and to the vertical axis Z of the latter. The static and dynamic forces originating from the suspended load L operate in the plane of symmetry A, and so too does the resulting force of reaction R.

Figure 1:
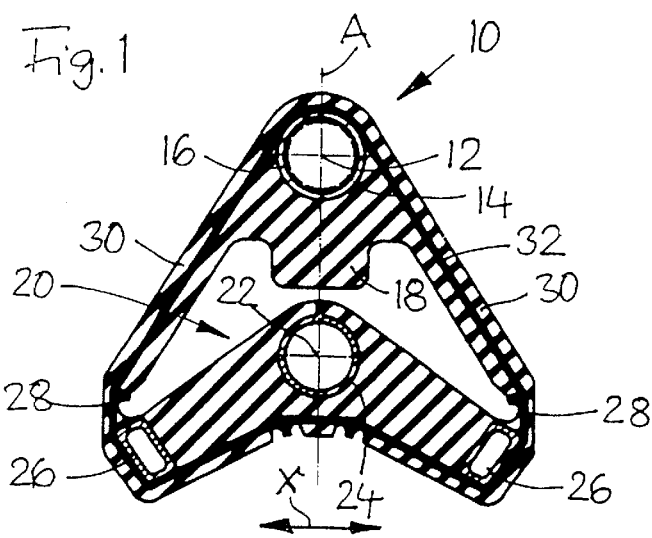
FIG. 1 shows a perpendicular section through a first suspension device, in the non-loaded condition.
Figure 2:
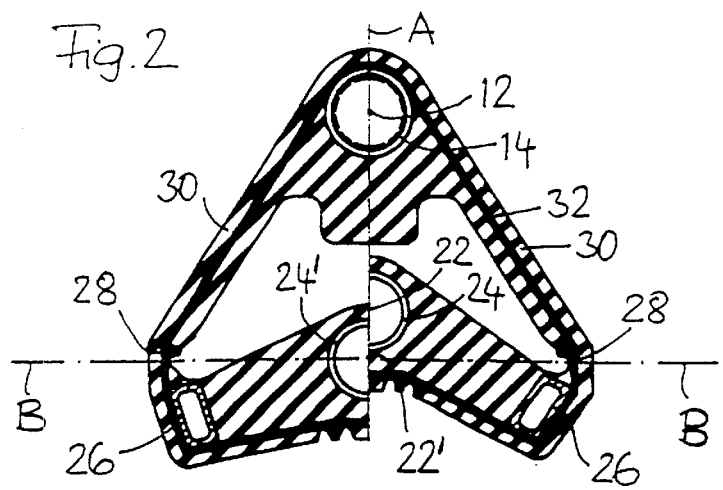
FIG. 2 shows the same suspension device, whose right half is represented in the non-loaded state and whose left half is represented in a position resulting from an assumed static loading.
Figure 3:
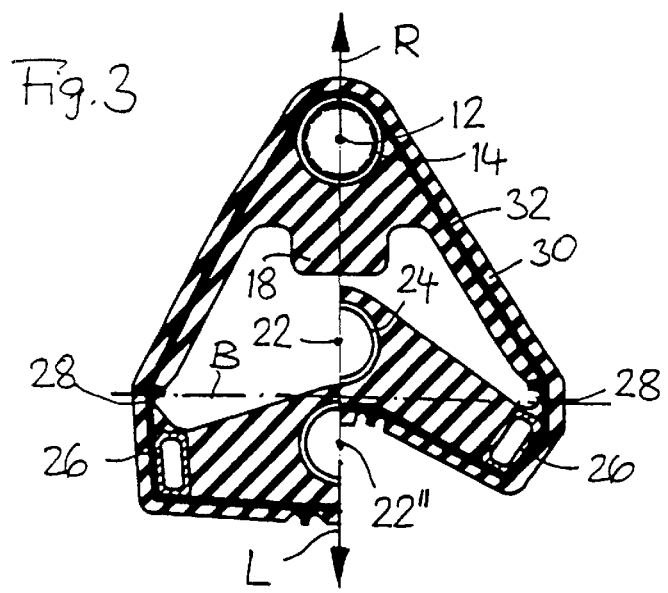
FIG. 3 shows the same suspension device, whose right half is again represented in the non-loaded condition but whose left half is represented in a position resulting from dynamic additional loading.

In the non-loaded condition illustrated in FIG. 1, the suspension device represented in FIGS. 1 to 4 has, viewed in the direction of the transverse axis Y of the vehicle, an outer contour similar to an equilateral triangle, whose base, however, is bent inwards in the upward direction or, in other words, angled in an arrow-shaped manner. The upper corner of this triangle is rounded and constructed as a carrying region 10 which has a virtual centre of application of force 12. In FIGS. 1 to 3 (as also in FIG. 5 and 6 as well as FIG. 15), the centre of application of force 12 is the axis of a cylindrical bush 14 made of metal or stiff plastic, which is embedded in, preferably vulcanised into, the carrying region 10 and which has, on its inner side, a lining 16 made of rubber or plastic having sliding properties. The bush 14 may, for example, be slipped onto a bolt which is fastened to a floor panel of a motor vehicle. Alternatively, a bolt of this kind may be directly received in a cylindrical hole in the carrying region 10. The said carrying region 10 may, as represented in FIGS. 1 to 3 inter alia, be prolonged downwards by a buffer 18.

Disposed underneath the carrying region 10 is a load beam 20 which has, in its middle, a virtual centre of distribution of load 22. The latter is formed, as represented in FIGS. 1 to 12, 16 and 17, by the geometrical axis of a cylindrical bush 24 which is embedded in, preferably vulcanised into, the load beam 20, or else, as illustrated in FIGS. 13 and 14, by the geometrical axis of a cylindrical hole. A bolt or the like, which is not represented but which is fastened to the exhaust system or other load L to be suspended, can be slipped into the bush 24 or directly into the hole in the load beam 20. In this case, the centre of distribution of load 22 is, at the same time, the centre of application of force. However, the load beam 20 may also be designed without a hole and without a bush 24, and may be connected, for example by means of a centrally disposed hasp clip, to the load to be suspended.

The load beam 20 is angled away from the centre of distribution of load 22 in such a way that it has the shape of an upwardly pointing arrow; in other words, the load beam 20 has the shape of an inverted V. A tubular supporting body 26 made of metal or stiff plastic is disposed, preferably vulcanised in, at each of its two ends. An articulating zone 28, as illustrated in FIGS. 1 to 4 and also in other examples which are represented, is constructed adjacent to each of the tubular supporting bodies 26, through the fact that the load beam 20 merges, with an abrupt decrease in stiffness, into a carrying leg 30 which connects it to the carrying region 10. Alternatively, the articulating zones 28 are constructed, for example as illustrated in FIG. 16, on the supporting bodies 26 themselves, through the fact that the latter are designed as hinge parts.

The carrying region 10, the carrying legs 30 and the load beam 20 are vulcanised or cast in one piece from rubber or rubber-like material and contain an inlay 32, which has low flexural strength but is essentially rigid in respect of tension, that is to say does not stretch appreciably under tensile load, and in any case stretches less than the rubber or rubber-like material in which the inlay 32 is embedded. The said inlay 32 preferably consists of a coil of thread or wire, or a textile fabric or wire mesh. When it is embedded in the rubber or rubber-like material, the inlay 32 is usually kept taut, as represented, preferably by the bush 14 which serves, in that respect, as a supporting body, by the two tubular supporting bodies 26 and also by one strip-shaped supporting body 34 (FIG. 4) in each case in the two articulating zones 28, at least until the vulcanisation or consolidation of the said material is completed. For the purpose of keeping the inlay 32 taut, there may additionally be provided, in its concave region underneath the centre of distribution of load 22, a plate-shaped supporting body 36 which, as illustrated in FIGS. 5 to 12 and 16, may be manufactured in one piece with the bush 24, for example extruded from metal or plastic.

The carrying region 10 and carrying legs 30 may also be produced from rigid material, for example metal; however, the connections between the carrying legs 30 and the load beam 20 must remain articulating ones.

In individual forms of embodiment of the invention, the supporting bodies 26, 34 and 36 may be omitted without replacement, as can be seen from FIG. 13.

In the case of that embodiment of the articulating zones 28 which is represented, for example, in FIGS. 1 to 4, care must be taken to ensure that, in the regions forming the articulating zone 28 which, according to FIGS. 1 to 4, are immediately underneath the strip-shaped supporting bodies 34, the inlay 32 is covered only with a layer of rubber or plastic which is of a thinness such that the stresses, in particular tensile stresses, occurring under operating conditions remain within admissible limits. The said layer is preferably of a thinness such that it is adequate for providing protection against environmental influences.

Apart from the presence of the plate-shaped supporting body 36, the suspension device illustrated in FIGS. 5 to 8 also differs from that represented in FIGS. 1 to 4 through the fact that there is inserted, in the carrying region 10 and in the two carrying legs 30, a leaf spring 38 which has a vertex region curved in a manner corresponding to the outer radius of the bush 14, is disposed with the said vertex region between the bush 14 and the inlay 32, and extends, inside the two carrying legs 30, as far as one of the articulating zones 28 in each case, or into the vicinity thereof. This leaf spring 38 contributes to increasing the stiffness of the suspension device in the direction of the longitudinal axis X of the vehicle and also in the direction of the transverse axis Y of the latter. Basically, it is desirable, for acoustic reasons, that a suspension device for an exhaust system in a motor vehicle should have low stiffness in the direction of all the axes (X, Y and Z). With respect to acceleration forces occurring under driving conditions, however, a selective increase in stiffness in the direction of individual axes is necessary in individual cases.

For example, increased stiffness in the direction of the longitudinal axis X of the vehicle is desirable when an exhaust system, whose front end is not connected rigidly to the appertaining combustion engine but is connected via an elastic intermediate member for sound-decoupling purposes, is to be suspended in the front region of a motor vehicle by means of the suspension device. That stiffening in the direction of the transverse axis Y of the vehicle which is also brought about by the leaf spring 38 is desirable, for example, when an exhaust system, whose tail pipe extends with little clearance through an opening in a rear apron of a motor vehicle, is to be suspended at the rear of the said vehicle.

However, the suspension device without the leaf spring 38, which device is represented in FIGS. 1 to 4, may be to be preferred when, for example, it is a matter of suspending, at the rear of a vehicle, an exhaust system which is rigidly connected, at the front, to the appertaining combustion engine; in this case, the suspension device is not subjected to loading with forces of inertia which occur during acceleration or braking of the vehicle which is travelling straight forward.

The suspension devices represented in FIGS. 1 to 4, 5 to 8 and 15 may be mounted in an oscillating manner at their centre of application of force 12, for example in consideration of thermal expansions of an exhaust system which is suspended from them and is secured, at another point on the motor vehicle, against longitudinal movements.

In contrast thereto, the suspension device represented in FIGS. 9 and 10 is prevented from oscillating by a carrying plate 40 which is embedded in, preferably vulcanised into, the carrying region 10 and can be screwed fast, for example to a floor panel of a motor vehicle, from below. Resting directly on the carrying plate 40, between the latter and the inlay 32, is the central region, which in this case is flat, of a leaf spring 38 which, in other respects, is embedded in, preferably vulcanised into, the carrying region 10 and the legs 30 in a manner similar to that in FIGS. 5 and 6. The suspension device represented in FIGS. 9 and 10 is therefore relatively stiff in the direction of the longitudinal axis X of the vehicle and also in the direction of the transverse axis Y of the latter.

On the other hand, the suspension devices represented in FIGS. 11 and 12, as well as those represented in FIGS. 14 and in FIGS. 16 and 17, are compliant in the direction of the longitudinal axis X of the vehicle. Although, as illustrated in FIGS. 11 and 12, a carrying plate 40 is, once again, embedded in the carrying region 10, the said carrying plate nevertheless extends, just like the carrying region 10 as a whole, over almost the entire length of the suspension device, measured in the direction of the longitudinal axis X of the vehicle, and the carrying legs 30 extend downwards, parallel to one another, so that they act as a parallelogram arm, and consequently the load beam 20 is able to oscillate to and fro in the direction of the longitudinal axis X of the vehicle against only slight resistance. In the direction of the transverse axis Y of the vehicle, too, the suspension device represented in FIGS. 11 and 12 is relatively compliant.

Moreover, the exemplified embodiments represented in FIGS. 9 and 10, FIGS. 11 and 12, FIG. 14 and FIGS. 16 and 17 have the advantage that all these suspension devices can easily be screwed from below onto a floor part of a motor vehicle, and screw-type assembly of this kind can even be automated.

The suspension device illustrated in FIG. 13 differs from that represented in FIGS. 11 and 12 above all through the fact that the carrying region 10 is essentially formed by a V-shaped carrying beam 42 which is designed so as to be symmetrical in relation to the load beam 20 with respect to a horizontal plane of symmetry S, and is connected to the two carrying legs 30, which once again are parallel to one another, by an articulating zone 48 in each case. Just like the articulating zones 28, the articulating zones 48 are simply the result of the fact that the carrying legs are considerably less rigid in respect of bending than the load beam 20 and the carrying beam 42.

If the suspension device illustrated in FIG. 13 is loaded in respect of tension by a load L and a corresponding force of reaction R, the load beam 20 and carrying beam 42 deform in such a way that their symmetry with respect to the plane of symmetry S is maintained. The suspension device illustrated in FIG. 13 is preferably dimensioned in such a way that, when subjected to normal static loading, for example by the inherent weight of an exhaust system, the load beam 20 and carrying beam 42 of the said device reach their stretched position, that is to say the centre of application of force 12 and the articulating zones 48 lie in a common horizontal upper plane, while the centre of distribution of load 22 and the articulating zones 28 lie in a common horizontal lower plane. Under the influence of additional dynamic loads, the two beams 20 and 42 may pass beyond their stretched position to a greater or lesser extent. The overall spring travel of the suspension device represented in FIG. 13 is the sum of the spring travels of the load beam 20 and carrying beam 42; in functional terms, therefore, the two beams 20 and 42 illustrated in FIG. 13 are connected in series.

The suspension device represented in FIG. 14, on the other hand, has a load beam 20 which is subdivided by openings 44 disposed on either side of the centre of distribution of load 22 into two beams which are angled in the same direction and have the shape of an Inverted V, namely an upper part 20', which is proximal with respect to the carrying region 10, and a lower, distal part 20". In the region of each of its two ends, the proximal part 20' of the load beam 20 has an articulating zone which is formed by an embedded bush 46 in each case. The angled lower end of a carrying leg 30 is rotatably mounted in each of the bushes. As illustrated in FIG. 14 (and as also illustrated in FIGS. 16 and 17), the carrying legs 30 consist of round steel and are mounted at the top on a carrying plate 40 in an oscillating manner. The forces of reaction R' which are caused by the suspended load L and which add up to a resulting force of reaction R are transmitted to the carrying plate 40 via the two bushes 46.

As illustrated in FIG. 14 (and as also illustrated in FIGS. 16 and 17), the middle region of the upper side of the load beam 20 forms a stop 18 which is able to strike against the carrying plate 40 when the load swings, that is to say, is a negative one at times.

As illustrated in FIG. 14, the two parts 20' and 20" of the load beam 20 are connected to one another centrally, in the example represented, by a hollow cylinder 50 which is manufactured in one piece with the said parts from rubber or rubber-like material. The geometrical axis of this hollow cylinder 50 forms the centre of distribution of load 22. Alternatively, there may be provided, as the central connection between the two parts 20' and 20" of the load beam 20, a bridge body made, for example, of plastic, which is embedded in, particularly vulcanised into, the said parts. As illustrated in FIG. 14, the inlay 32, which is essentially rigid in respect of tension, wraps around the two bushes 46 and also around two other bushes 52 which are each embedded in an end region of the distal part 20" of the load beam 20.

The design and arrangement represented in FIG. 14 for the two parts 20' and 20" of the load beam 20 corresponds to a parallel connection of the said two parts, with the result that the spring travel of the entire suspension device is equal to the spring travel of each of the two parts 20' and 20" individually, whereas the spring stiffness of the suspension device is equal to the sum of the stiffnesses of the two parts 20' and 20".

The exemplified embodiment represented in FIG. 15 combines that design of the carrying region 10 which is represented in FIGS. 1 to 4 and also in FIGS. 5 and 6, with the subdivision, which is represented in FIG. 14, of the load beam 20 into a proximal part 20' and a distal part 20".

In the exemplified embodiment represented in FIGS. 16 and 17, the carrying legs 30 are manufactured, as in FIG. 14, from round steel and are suspended in an oscillating manner from a carrying plate 40 which, for its part, is to be fastened, for example screwed, onto a floor panel of a motor vehicle from below. In a manner coinciding with, inter alia, FIGS. 1 to 4, the load beam illustrated in FIGS. 16 and 17 is undivided. The articulating zones 28 are each constructed in one of two supporting bodies 26, which are each embedded in an end region of the load beam 20.

Apart from their low space requirement in the Z direction, all the represented forms of embodiment of suspension devices according to the invention have the advantage that their force/travel characteristic in the Z direction can, if desired, be designed so as to be linear within a large range which is adequate for all practical requirements. Suspension devices of this kind are therefore particularly well suited for limousines and other vehicles which have to meet high requirements as regards comfort.

What is claimed is:

1. A suspension device for a swinging load (L), in particular for an exhaust system in a motor vehicle, the said device having a carrying region (10), at which the suspension device is to be connected to a carrying structure, a flexible load beam (20) which essentially consists of elastomer material, is disposed between two articulating zones (28) and has a centrally disposed center of load distribution (22) from which the load (L), which acts on the said load beam centrally, is distributed to the two articulating zones (28), two carrying legs (30) which each connect one of the said articulating zones (28) to the carrying region (10), and an inlay (32) which has low flexural strength but is essentially rigid in respect of tension and which extends along a zone of the load beam (20), which zone is stressed in respect of tension when under load (L), at least as far as the two articulating zones (28), the two articulating zones (28) being arranged in a common transverse plane (B) which extends transversely to the direction of action of the load (L) and in which they are movable towards and away from one another when the load changes, wherein the center of distribution of load (22) is disposed, in the non-loaded condition, between the carrying region (10) and the transverse plane (B), and the load beam (20) is adapted to approach a stretched position in which the center of distribution of load (22)

lies in the transverse plane (B) when the suspension device is subjected to a load (L) which increases and is directed away from the said carrying region (10).

2. The Suspension device according to claim 1, wherein the inlay (32) is supported on supporting bodies (14, 26, 34, 36, 46) which are embedded in the carrying region (10) and/or the load beam (20) and/or the carrying legs (30).

3. The suspension device according to claim 1, wherein the carrying region (10) and the two carrying legs (30) have a stiffening leaf spring (38).

4. The suspension device according to claim 1, wherein a carrying plate (40), which is to be connected to a carrying structure in such a way that it resists oscillation of the carrying region (10), is embedded in the said carrying region (10).

5. The suspension device according to claim 1, wherein the carrying region (10) has as the center thereof, a center of application of force (12) from which the suspension device can be suspended in an oscillating manner.

6. The suspension device according to claim 5, wherein the carrying region (10) has a flexible carrying beam (42) which is angled in the opposite direction to the load beam (20) (FIG. 13).

7. A suspension device according to one of claims 1 to 6, wherein
the load beam (20) is subdivided, by openings (44) disposed between the center of distribution of load (22) and the articulating zones (28), into a part (20') which is proximal with respect to the carrying region (10), and a distal part (20"), both of which parts are angled so as to point towards the said carrying region (10) in an arrow-shaped manner.

8. A suspension device according to one of claims 1 to 6, wherein
the mobility of the load beam (20) towards the carrying region (10) is limited by a buffer (18) disposed on at least one of the said two parts.

9. A suspension device according to one of claims 1 to 6, wherein
the carrying legs (30) are essentially rigid and the articulating zones (28) connecting them to the load beam (20) are designed as bush/bolt connections.

10. A suspension device according to one of claims 1 to 6, wherein
the carrying region (10) and the carrying legs (30) consist, at least partially, of elastomer material.

* * * * *